United States Patent [19]

Langan et al.

[11] Patent Number: 5,293,628
[45] Date of Patent: Mar. 8, 1994

[54] DATA PROCESSING SYSTEM WHICH GENERATES A WAVEFORM WITH IMPROVED PULSE WIDTH RESOLUTION

[75] Inventors: John A. Langan; Robert J. Amedeo; Roberto M. Frontera, all of Austin, Tex.

[73] Assignee: Motorola, Inc., Schaumburg, Ill.

[21] Appl. No.: 787,167

[22] Filed: Nov. 4, 1991

[51] Int. Cl.⁵ .............................................. G06F 1/04
[52] U.S. Cl. ..................................... 395/550; 307/265
[58] Field of Search ........... 307/269, 265, 266, 267, 307/268; 395/550; 364/270.2, 271.6; 328/58; 377/39, 44, 52, 110

[56] References Cited

U.S. PATENT DOCUMENTS

| | | | |
|---|---|---|---|
| 4,191,998 | 3/1980 | Carmody | 307/269 |
| 4,435,757 | 3/1984 | Pross, Jr. | 364/200 |
| 4,546,269 | 10/1985 | Johnson | 395/550 |
| 4,564,953 | 1/1986 | Weiking | 307/269 |
| 4,618,968 | 10/1986 | Sibigtroth | 377/39 |
| 4,754,163 | 1/1988 | Aue et al. | 307/265 |
| 4,870,665 | 9/1989 | Vaughn | 328/61 |
| 4,881,040 | 11/1989 | Vaughn | 307/265 |
| 4,935,944 | 6/1990 | Everett | 377/48 |
| 4,989,223 | 1/1991 | Katayose et al. | 377/39 |
| 5,029,272 | 7/1991 | FourCroy et al. | 307/518 |
| 5,039,950 | 8/1991 | McDermott | 307/269 |
| 5,086,387 | 2/1992 | Arroyo et al. | 307/269 |
| 5,223,742 | 6/1993 | Schumacher | 377/39 |

FOREIGN PATENT DOCUMENTS

| | | | |
|---|---|---|---|
| WO88/07289 | 9/1988 | European Pat. Off. | H03K 5/05 |
| 3302744A1 | 1/1983 | Fed. Rep. of Germany | H03K 3/017 |
| 2342585 | 2/1977 | France | H03K 5/04 |
| 58-047325 | 3/1983 | Japan | H03K 7/08 |

*Primary Examiner*—Dale M. Shaw
*Assistant Examiner*—Moustafa Meky
*Attorney, Agent, or Firm*—Susan C. Hill

[57] ABSTRACT

A data processing system (10) capable of generating an output waveform (22) that has enhanced pulse width resolution. In one form, the system uses a counter (34) which is incremented by an input clock (20) running at an operating frequency of the system. Instead of incrementing the counter (34) by one, the counter (34) is incremented by a power of two so that the counter (34) appears to be counting a power of two faster. However, in order to increase the effective resolution of the counter (34), the second edge of the output waveform (22) must be correctly adjusted depending on the desired duty cycle and period. The end result is a counter (34) that can produce a power of two greater resolution while still using the operating frequency of the system as an input clock (20).

20 Claims, 4 Drawing Sheets

DATA PROCESSING SYSTEM WHICH GENERATES A WAVEFORM WITH IMPROVED PULSE WIDTH RESOLUTION

FIELD OF THE INVENTION

The present invention relates in general to data processors, and more particularly to waveform generation in a digital data processor.

BACKGROUND OF THE INVENTION

Microcomputers today are used to control a wide variety of products ranging from a simple household appliance to a complex automobile. One of the important uses carried out by the microcomputer is timing control. Timing control can also range from the very simple to the very complex. A household appliance may only require a microcomputer timer to count how much time has elapsed between two events in order to control the appliance. An automobile, on the other hand, may require the timer to generate or recognize complex waveforms in order to control the automobile engine.

An important use for timer functions, other than control, is the generation of clocks for communication systems. Communication systems transfer data between multiple locations. Some communication systems require one or more clocks in order to determine when the various bits of data are to be sent. A timer is a convenient device which can be used to generate the clocks required by a communication system. A timer can also be used to generate a wide range of output waveforms that can be used for purposes other than control and the clocking of communication information.

In order to discuss timers, it is necessary to define the basic terminology of a waveform, such as period, cycle, frequency, pulse width, and duty cycle. Period and cycle are being used synonymously in this document. The period or cycle of a waveform is the length of time between any two rising edges or any two falling edges of the waveform. The frequency of a waveform is the inverse of the period, that is frequency = 1/period. As the period increases, the frequency decreases. Therefore, a waveform with a long period has a low frequency.

The pulse width of a waveform is the length of time that the pulse remains in a predetermined state, either high or low. The duty cycle of a waveform is the percentage of time that the waveform is high during the total waveform period. For example, a waveform that has a 70% duty cycle is high for 70% of the total period and low for the remaining 30% of the period. A waveform that has a 50% duty cycle is high for 50% of the total period and low for the remaining 50% of the period. And a waveform with a 20% duty cycle is high for 20% of the total period and low for the remaining 80% of the period.

Many timers operate by using an input clock, a counter, and some type of compare logic. The counter is used to keep track of the length of time that has elapsed from an initial starting time. The counter is incremented by the first edge of the input clock. On the second edge of the input clock, the contents of the counter are compared to a preprogrammed value to determine if the two values match. If a match occurs, the timer has determined that a sufficient length of time has elapsed since the initial starting time. The timer then performs the appropriate function, such as causing an interrupt or driving a value on an output pin. If a match does not occur, the timer has determined that a sufficient time has not elapsed since the initial starting time and the counter is again incremented on the next edge of the input clock.

Because the counter value changes after each increment, the compare operation must be performed after each increment of the counter. If a compare is not performed after each increment, a match may occur and yet go undetected. There are only two edges during each period of the input clock. The first edge is used to increment the counter and the second edge is used to trigger the compare operation. As a result, the counter can only be incremented once during each period of the input clock. Thus the effective rate at which the counter can count is limited by the frequency of the input clock. A standard counter with an input clock frequency of "F" can only count at the rate of "F". For example, a counter with an input clock of 6 megahertz can only count at the rate of 6 megahertz.

The rate at which a counter can count determines the resolution of the timer. The resolution of existing timers is limited by the frequency of the input clock. Many microcomputer customers want timers that have greater resolution. And unfortunately, the easy solution of merely increasing the frequency of the input clock in order to increase the resolution of the timer is usually not a viable option. The input clock to the timer is usually the fastest system clock operating throughout the entire microcomputer. Increasing the speed of this system clock affects all parts of the system, not just the timer. Some circuitry within the microcomputer will not operate correctly above a certain maximum frequency, and this maximum frequency may not be great enough to produce the required resolution in the timer.

SUMMARY OF THE INVENTION

The previously mentioned needs are fulfilled and other advantages achieved with the present invention. In one form, the present invention comprises an apparatus and a method for generating an output signal with a reduced pulse width resolution period. The data processing system comprises a data processor for providing a control signal, a clock generator for providing a clock signal of predetermined period, and a logic means. The logic means has a clock input coupled to the clock signal, a control input coupled to the data processor for receiving the control signal, and an output signal. The output signal has a pulse width determined by the control signal, and a pulse width resolution period which is equal to the predetermined period of the clock divided by a power of two. The logic means selectively adjusts the output signal by a predetermined amount in order to lengthen the output signal in response to the control signal.

The present invention will be understood by one skilled in the art from the detailed description below in conjunction with the accompanying drawings.

DESCRIPTION OF THE PREFERRED EMBODIMENT

The terms "assert" and "negate" will be used when referring to the rendering of a signal, status bit, or similar apparatus into its logically true or logically false state, respectively. The symbol "%" preceding a number indicates that the number is represented in its binary or base two form.

Figure 1A:
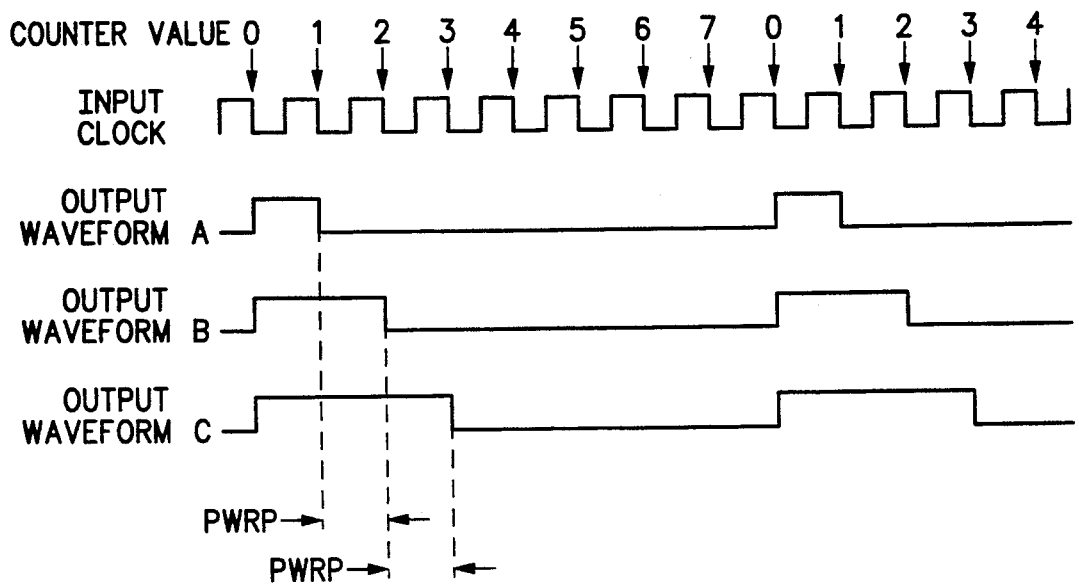
FIG. 1A illustrates, in timing diagram form, output waveforms generated by a prior art device.

FIG. 1A illustrates output waveforms A, B, and C which are generated by a prior art timing device. The prior art timing device has a pulse width resolution period (PWRP) equal to one period of the input clock.

Pulse width resolution period (PWRP) is a characteristic of a device that generates waveforms, it is not a characteristic of a single waveform itself. The PWRP of a device is determined by comparing the duration of two pulses that have as close to the same pulse widths as the device is capable of producing. For example, referring to the prior art in FIG. 1A, the durations of the pulse widths of waveforms A, B, and C are as close to the same pulse width as the prior art timing device is capable of producing. To determine the PWRP, the pulse widths of the shortest pulse (output waveform A) and the next shortest pulse (output waveform B) are compared. The difference in duration of the two pulses is the length of time labeled "PWRP". The PWRP of the prior art timing device is equal to one period of the input clock. The timing device's PWRP remains constant for all other waveforms that the device generates using the same configuration. For example, output waveforms B and C also differ in duration by one period of the input clock.

The pulse width resolution period of a device is measured in units of time and for many applications it is advantageous for a device to have as small a PWRP as possible. A smaller PWRP allows a device to generate pulses with intermediate pulse widths that cannot be generated by a device with a larger PWRP. These intermediate pulse widths may be required by certain peripheral devices, such as stepper motors or communication receivers, which are receiving and using the pulses generated by the timing device.

As discussed above, FIG. 1A illustrates output waveforms A, B, and C which are generated by a prior art timing device. The prior art device uses the input clock signal as an input to a three-bit counter (not shown). The counter is incremented on every other edge of the input clock signal. Each arrow in FIG. 1A indicates an increment of the counter. The numbers above the arrows indicate the value that is contained in the counter before the increment takes place. The three-bit counter starts with the value of 0 and increments by one until the counter contains the maximum count value of 7. When the counter contains the value 7 and is incremented by one, the counter rolls over to 0. The remaining edges of the input clock, in this example the rising edges, are used for a compare operation (not shown) and cannot be used to increment the counter.

Figure 1B:
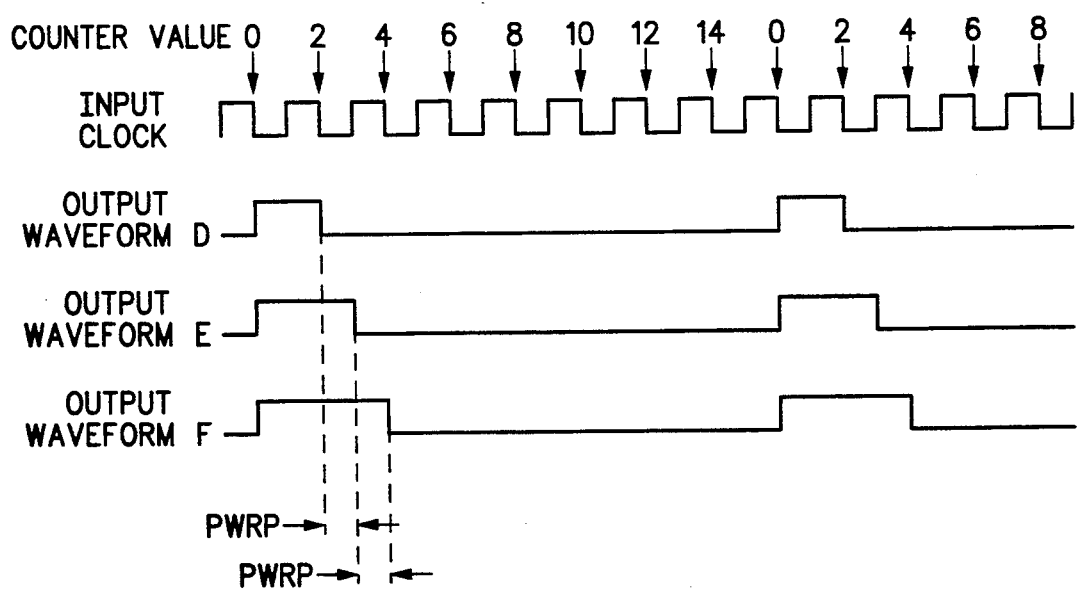
FIG. 1B illustrates, in timing diagram form, output waveforms generated by one embodiment of the present invention.

FIG. 1B illustrates the improvement over the prior art which is provided by the present invention. An approach was needed that increased the resolution of the timer without requiring an increase in the frequency of the input clock to the timer.

FIG. 1B illustrates output waveforms D, E, and F which are generated by one embodiment of the present invention. This embodiment uses the same input clock signal as the prior art. The input clock signal is used as an input to a four-bit counter (not shown). Just like the prior art, the counter is incremented on every other edge of the input clock signal. Each arrow in FIG. 1B indicates an increment of the counter. The numbers above the arrows indicate the value that is contained in the counter before the increment takes place. The four-bit counter starts with the value of 0 and counts up to the value 14 by increments of two. When the counter contains the value 14 and is incremented by two, the counter rolls over to 0. The remaining edges of the input clock, in this example the rising edges, are used for a compare operation (not shown) and cannot be used to increment the counter.

The PWRP illustrated in FIG. 1B is equal to one-half of one period of the input clock and was generated by one embodiment of the present invention. Thus the PWRP of the illustrated embodiment is one-half of the PWRP of the prior art using the same input clock period. This is a significant improvement over the prior art. The present invention allows a prior art device to be modified by a small amount of circuitry in order to produce a doubling of performance. Decreasing the PWRP of a device from a full period of the input clock to one-half a period of the input clock is a doubling of performance. Although the performance improvement illustrated in FIG. 1B is only double that of the prior art, the present invention will also permit a four times increase in performance, an eight times increase in performance, and in fact a $2^N$ increase in performance where N is an integer.

Figure 2:
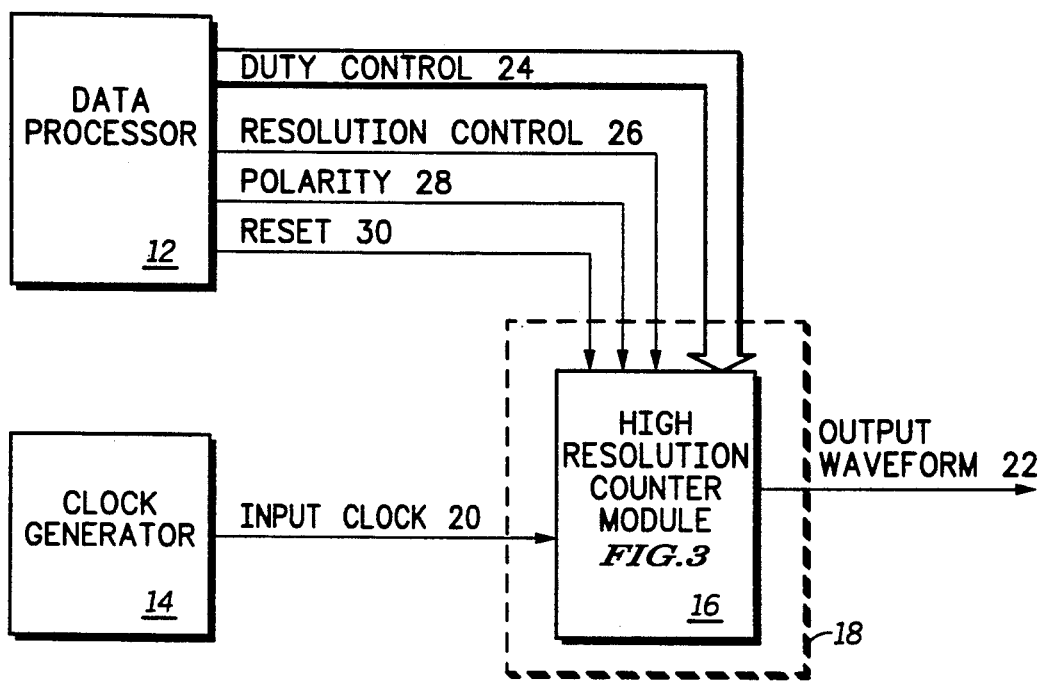
FIG. 2 illustrates, in block diagram form, a data processing system having circuitry with a reduced pulse width resolution period in accordance with one embodiment of the present invention.

FIG. 2 illustrates a data processing system 10 which has a data processor 12, a clock generator 14, and a high resolution counter module 16. High resolution counter module 16 may optionally be part of the timer or serial subsystem 18 within data processing system 10. Clock generator 14 generates an input clock 20 which is an input to high resolution counter module 16. High resolution counter module 16 generates an output waveform 22.

Data processor 12 outputs several control signals to high resolution counter module 16, including duty control signals 24, a resolution control signal 26, a polarity signal 28, and a reset signal 30. In the present embodiment, duty control signals 24 are multiple signals, but other embodiments may use only one signal to transmit duty control information from the data processor 12 to the high resolution counter module 16.

The present invention requires that duty control information be transmitted from the data processor 12 to the high resolution counter module 16. The remaining control signals, resolution control signal 26, polarity signal 28, and reset signal 30, are optional. These three optional control signals are used in the present embodiment of the invention, but they are not required.

Still referring to FIG. 2, the high resolution counter module 16 uses the input clock 20 and all of the control inputs from data processor 12 in order to generate the output waveform 22. Output waveform 22 can be generated so that it has a pulse width resolution period (PWRP) that is equal to the period of the input clock 20 divided by a power of two. Similar prior art devices can only generate output waveforms with a PWRP that is equal to the period of the input clock 20. This is a disadvantage of prior art devices. For many applications it is advantageous for a device to have as small a PWRP as possible. A smaller PWRP allows a device to generate pulses with intermediate pulse widths that cannot be generated by a device with a larger PWRP. These intermediate pulse widths may be required by certain peripheral devices, such as stepper motors or communication receivers, which are receiving and using the pulses generated by the timing device.

Figure 3:
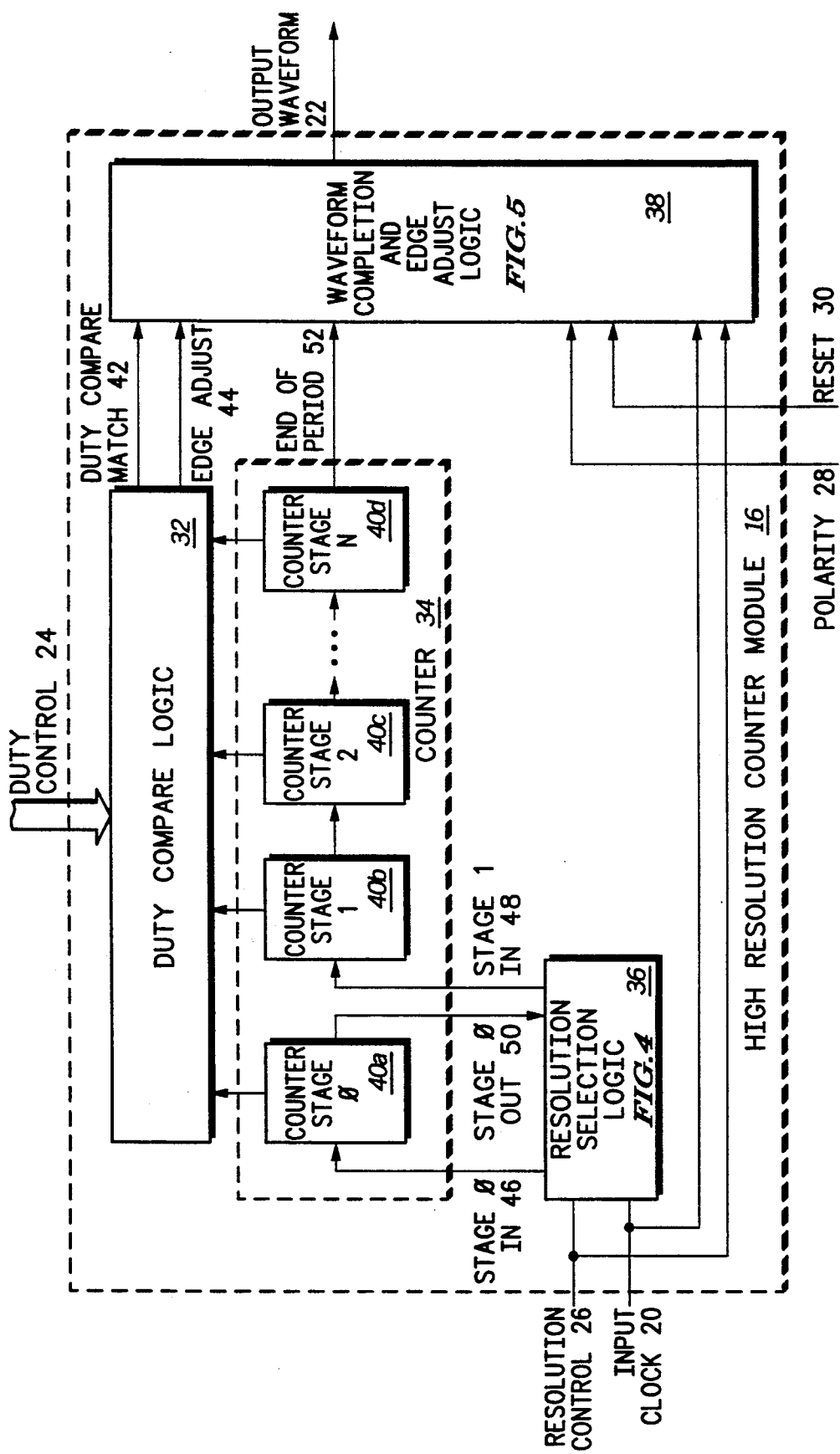
FIG. 3 illustrates, in block diagram form, a high resolution counter module of FIG. 2 in accordance with one embodiment of the present invention.

FIG. 3 illustrates in greater detail the structure of the high resolution counter module 16 of FIG. 2. High resolution counter module 16 contains a duty compare logic 32, a counter 34, a resolution selection logic 36, and a waveform completion and edge adjustment logic 38. Counter 34 contains N counter stage circuits, of which four counter stage circuits, counter stage 0 circuit 40a, counter stage 1 circuit 40b, counter stage 2 circuit 40c, and counter stage N circuit 40d, are illustrated.

Duty compare logic 32 receives duty control signals 24 as inputs. Also, duty compare logic 32 receives, as inputs, the contents of each counter stage, counter stage 0 circuit 40a, counter stage 1 circuit 40b, counter stage 2 circuit 40c, and counter stage N circuit 40d. Duty compare logic 32 generates two output signals, a duty compare match 42 and an edge adjust 44, which are inputs to the waveform completion and edge adjustment logic 38.

Resolution control signal 26 is an input to both the resolution selection logic 36 and the waveform completion and edge adjustment logic 38. Input clock 20 is likewise an input to both the resolution selection logic 36 and the waveform completion and edge adjustment logic 38. Resolution selection logic 36 outputs STAGE 0 IN signal 46 as an input to counter stage 0 circuit 40a. Also, resolution selection logic 36 outputs STAGE 1 IN signal 48 as an input to counter stage 1 circuit 40b. Counter stage 0 circuit 40a outputs STAGE 0 OUT signal 50 as an input to resolution selection logic 36. Counter stage N circuit 40d outputs an end of period signal 52 as an input to the waveform completion and edge adjustment logic 38.

Polarity signal 28 and reset signal 30 are both inputs to the waveform completion and edge adjustment logic 38. Waveform completion and edge adjustment logic 38 generates output waveform 22.

Although FIG. 3 illustrates an N-stage or N-bit counter, the particular embodiment that will be described will be a four-bit counter that is able to produce the output waveforms illustrated in FIG. 1B. The extension from a four-bit counter to an N-bit counter merely requires the addition of more counter stages and the repetition of existing logic in the duty compare logic 32. So in the described embodiment, N=4 and counter 34 is a four-bit counter.

In operation, counter 34 performs a counting function. One of the counter stages receives the input clock 20 as an input. Which counter stage receives the input clock 20 as an input determines whether the counter 34 counts or increments by one, by two, by four, or by $2^N$.

During each period, input clock 20 has two edges. On the first edge of input clock 20, the counter is incremented by either one, two, four, or $2^N$. On the second edge of input clock 20, the contents of counter 34 (i.e. the contents of each counter stage 40a, 40b, 40c, and 40d) are compared to a user programmed value in duty compare logic 32 in order to determine if there is a match. On the next first edge of input clock 20, the counter is again incremented and this cycle of increment and compare is continued until a match is found.

Once a match is found, the duty compare match signal 42 is asserted to indicate that the logic state of output waveform 22 should be inverted by the waveform completion and edge adjustment logic 38. The counter 34 continues to count. When counter 34 reaches its maximum count value and rolls over to its lowest count value, counter stage N circuit 40d produces an end of period signal 52 which indicates that the end of the period of the output waveform 22 has been reached and that the logic state of output waveform 22 should once again be inverted by the waveform completion and edge adjustment logic 38. Consequently, the period of the output waveform 22 is determined by the amount of time it takes for counter 34 to increment from its lowest count value to its maximum count value and then roll over to its lowest count value again.

In the present embodiment, the period of output waveform 22 can be programmed by selecting how many stages of counter 34 will actually be utilized. The more stages that counter 34 utilizes, the higher the maximum count value. The higher the maximum count value, the longer it takes to count up from the lowest count value to the maximum count value, and thus the longer the period of output waveform 22. For example, if the user selects to utilize only three stages of counter 34, then the output of counter stage 2 circuit 40c passes directly through all higher counter stages and is output from counter stage N 40d as the end of period signal 52. If a counter stage is utilized, its input from the prior stage does not pass through, but is instead used as a carry in bit by the receiving counter stage.

The duty control signals 24 determine the duty cycle of output waveform 22. The duty cycle of output waveform 22 is the percentage of time that output waveform 22 is high during its total waveform period. Note, however, that if polarity signal 28 indicates that the polarity of output waveform 22 is inverted, then the duty cycle of output waveform 22 is the percentage of time that output waveform 22 is low during its total waveform period.

In the disclosed embodiment of the present invention, the duty control signals 24 represent a number of half-cycles or half-periods of input clock 20. If the polarity of output waveform 22 is not inverted, then a value of "2" transmitted by duty control signals 24 indicates that output waveform 22 is high for "2" half-periods (or one full period) of input clock 20. Output waveform D in FIG. 1B illustrates an output waveform 22 that has a duty control 24 value of "2". A value of "3" transmitted by duty control signals 24 indicates that output waveform 22 is high for "3" half-periods of input clock 20. Output waveform E in FIG. 1B illustrates an output waveform 22 that has a duty control 24 value of "3". Likewise, a value of "4" transmitted by duty control signals 24 indicates that output waveform 22 is high for "4" half-periods (or two full periods) of input clock 20.

Output waveform F in FIG. 1B illustrates an output waveform 22 that has a duty control 24 value of "4".

Note that output waveforms D and F in FIG. 1B both have an "even" duty control 24 value. Output waveform D is high for "2" half-periods of input clock 20 and output waveform F is high for "4" half-periods of input clock 20. Because the counter 34 which produced the output waveforms illustrated in FIG. 1B was incremented by two, the counter 34 contents incremented from 0 to 2, to 4, to 6, up to the maximum even value of the counter 34 before it rolled over to 0 again. Thus, counter 34 could match the duty control 24 value and produce output waveform D when the counter contained the count value "2". Likewise, the counter 34 contents could match the duty control 24 value for output waveform F when the counter contained the count value "4".

However, a problem arises when the duty control 24 value is "odd" rather than "even". Because the counter 34 is counting by two, the counter value will always be even and a match will never occur with an "odd" duty control 24 value. The case of "odd" duty control 24 values is thus treated specially. If the counter 34 is counting by two and the duty control 24 value is "odd", the least significant bits of both the counter 34 and the duty control 24 value are not compared. So counter stage 0 circuit 40a is not compared to the least significant bit of the duty control 24 value. However, all of the remaining bits are still compared. Thus an "odd" duty control 24 value will cause a match on the next smaller "even" counter value. For example, if the least significant binary bits are not compared, a "3" represented in binary by %0011 will match with a "2" represented in binary by %0010. Likewise, any odd number represented in binary by %xyz1 will match with the next smaller even number represented in binary by %xyz0.

Therefore, for "odd" duty control 24 values, a match occurs on the next smaller "even" counter value. So for "odd" duty control 24 values, the duty compare match signal 42 is asserted too soon. To correct for this premature assertion of duty compare match signal 42, duty compare logic 32 sends an edge adjust signal 44 to the waveform completion and edge adjustment logic 38. This edge adjust signal 44 indicates to the waveform completion and edge adjustment logic 38 that it should wait one extra input clock 20 edge before inverting the logic state of output waveform 22. Thus for all "odd" duty control 24 values, the length of time that the output waveform 22 is high, (assuming that the polarity of output waveform 22 is not inverted), is lengthened or delayed by one-half input clock 20 period.

The duty compare logic 32 determines whether the duty control 24 value is "even" or "odd" by looking at the least significant binary bit of the duty control 24 value. If the least significant binary bit of the duty control 24 value is a "0", the value is even and no edge adjust delay is required. If the least significant binary bit of the duty control 24 value is a "1", the value is odd and an edge adjust delay is indeed required.

As an illustration, output waveform E in FIG. 1B has a duty control 24 value equal to "3", which is represented in binary as %0011. Duty compare logic 32 ignores the least significant bit of the counter 34 and finds a match when the counter contains "2", which is represented in binary as %0010. Note that a duty control 24 value equal to "2" would also have resulted in the duty compare match signal 42 being asserted at the same time. But because the duty control 24 value is "odd", duty compare logic 32 also asserts the edge adjust signal 44. The waveform completion and edge adjustment logic 38 uses the edge adjust signal 44 to differentiate between the "even" case when the inversion of output waveform 22 should not be delayed and the "odd" case when the inversion of output waveform 22 should be delayed one-half period of the input clock 20.

As a result of incrementing counter 34 by two and delaying the inversion of output waveform 22 for all "odd" duty control 24 values, the high resolution counter module 16 is able to produce waveforms with one-half the pulse width resolution period (PWRP) of prior art devices. This is a doubling of performance.

Although FIG. 3 of the disclosed embodiment only illustrates a counter 34 which can produce output waveforms 22 with the same performance or double the performance of prior art devices, it would be possible to extend the present invention to produce waveforms with $2^N$ times the performance of prior art devices. However, the complexity of the edge adjust circuitry would increase.

For example, to get a four times performance increase, counter 34 must be incremented by four and the least two significant bits must not be compared. The duty compare logic 32 then finds a match when counter 34 contains "4" or binary %0100 if the duty control 24 value is "4", "5", "6", or "7". Instead of simply using the edge adjust signal 44 to indicate whether the duty control 24 value is "even" or "odd", duty compare logic 24 must now differentiate between four possible values that differ from each other in their binary representations by the two least significant bits.

In addition, to get a four times performance increase, the two edges which occur during one input clock 20 period are not sufficient to produce the required delay periods. A signal must be available that has four edges during one input clock 20 period in order to produce output waveforms with a pulse width resolution period (PWRP) equal to one-fourth of the input clock 20 period. The requirement of a signal that has four edges during one input clock 20 period (i.e. a signal twice the frequency of input clock 20) defeats part of the advantage of the present invention. The present invention achieves a doubling of performance using the same input clock 20 frequency as the prior art and without requiring any signal that has a frequency greater than input clock 20.

Moving on to another part of FIG. 3, resolution selection logic 36 is used to choose between possible configurations of high resolution counter module 16. Resolution selection logic 36 programmably selects which stage of counter 34 is directly incremented by input clock 20. Which counter stage is directly incremented by input clock 20 determines whether the counter 34 counts by one, by two, by four, or by $2^N$. If counter stage 0 circuit 40a is directly incremented by input clock 20, then counter 34 is incremented by one. If counter stage 1 circuit 40b is directly incremented by input clock 20, then counter 34 is incremented by two. And if counter stage N circuit 40d is directly incremented by input clock 20, then counter 34 is incremented by $2^N$.

In the illustrated embodiment, resolution control signal 26 indicates to resolution selection logic 36 whether the user is programmably choosing to increment counter 34 by one or by two. If the user chooses the "increment by one" configuration, the resulting output waveform 22 will have a pulse width resolution period (PWRP) equal to one input clock 20 period, which is the same as the prior art. But if the user chooses the "increment by two" configuration, the resulting output waveform 22 will have a PWRP equal to one-half of the input clock 20 period, which is double the performance of the prior art. In the general case, the "increment by $2^N$" configuration, the resulting output waveform 22 will have a PWRP equal to the input clock 20 period divided by $2^N$, which is $2^N$ times the performance of the prior art.

It is important to note that other embodiments of the present invention do not require resolution control signal 26 and resolution selection logic 36. Other embodiments could directly hardwire input clock 20 to one fixed stage of counter 34. But if input clock 20 is directly hardwired to one fixed stage of counter 34, the PWRP of the output waveforms 22 produced will be fixed. The advantage of using resolution control signal 26 and resolution selection logic 36 is that the user can programmably reconfigure the circuitry to choose a different length of the PWRP of the output waveform 22.

Figure 4:
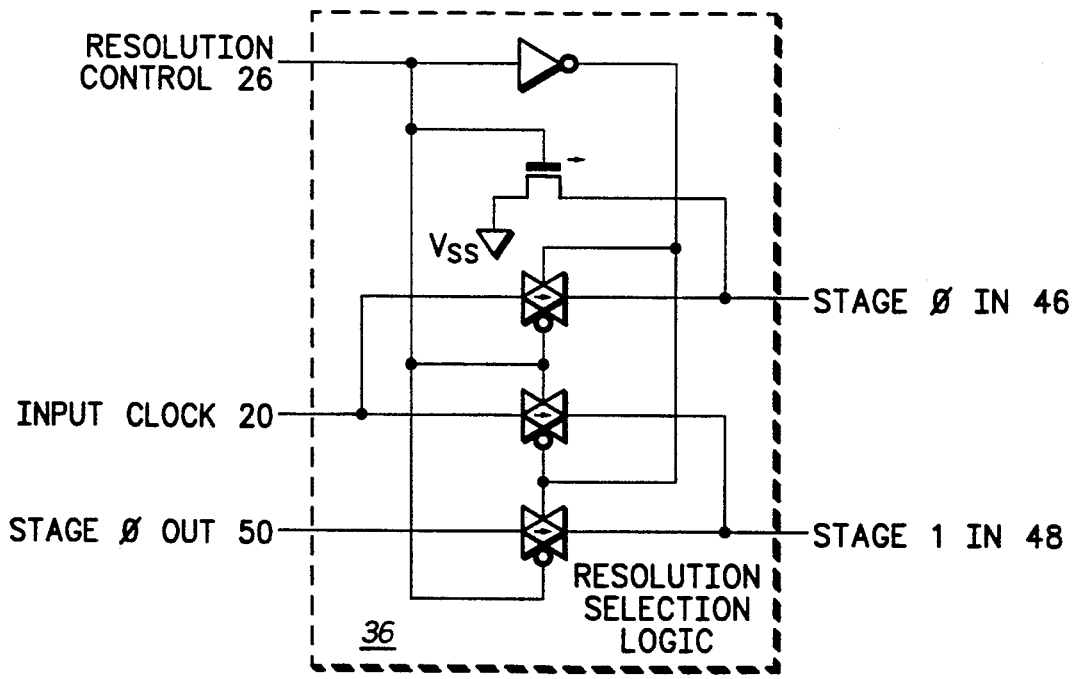
FIG. 4 illustrates, in partial logic diagram form, a resolution selection logic circuit of FIG. 3 in accordance with one embodiment of the present invention.

FIG. 4 illustrates one implementation of the resolution selection logic 36. Referring to both FIG. 3 and FIG. 4, the resolution control signal 26 determines whether input clock 20 is input to counter stage 0 circuit 40a across STAGE 0 IN signal 46 or whether input clock 20 is input to counter stage 1 circuit 40b across STAGE 1 IN signal 48. If input clock 20 is being input to counter stage 0 circuit 40a, then STAGE 0 OUT signal 50, which is the output of counter stage 0 circuit 40a, is fed into the input of counter stage 1 circuit 40b across STAGE 1 IN signal 48. If input clock 20 is being input to counter stage 1 circuit 40b, then counter stage 0 circuit 40a, STAGE 0 IN signal 46, and STAGE 0 OUT signal 50 are not used.

Figure 5:
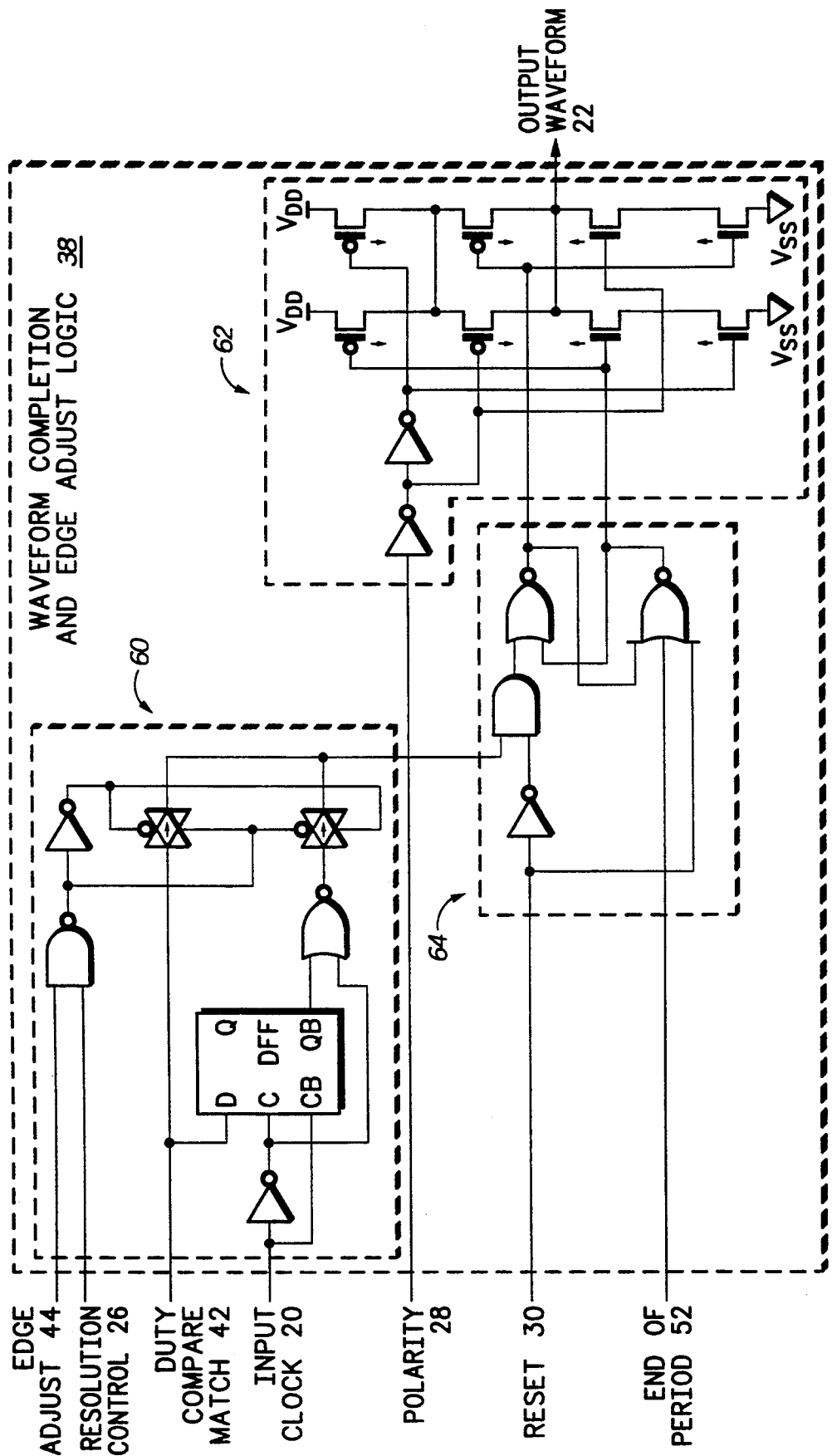
FIG. 5 illustrates, in partial logic diagram form, a waveform completion and edge adjust logic circuit of FIG. 3 in accordance with one embodiment of the present invention.

FIG. 5 illustrates one implementation of the waveform completion and edge adjustment logic 38. The circuitry of waveform completion and edge adjustment logic 38 can be functionally divided into three sub-blocks.

The first sub-block is edge adjust logic 60. Edge adjust logic 60 receives four signals as inputs, namely edge adjust 44, resolution control 26, duty compare match 42, and input clock 20. These four input signals are used to determine whether output waveform 22 should be inverted, and if so, whether the inversion of output waveform 22 should be delayed by one-half of the input clock 20 period. Output waveform 22 is inverted when duty compare match 42 indicates that there has been a match. The inversion of the output waveform 22 is only delayed if the resolution control signal 26 indicates that the counter 34 is counting by two, and the edge adjust signal 44 indicates that the duty control 24 value is "odd" rather than "even". If a delay is required, edge adjust logic 60 generates that delay.

The second sub-block is polarity determination logic 62. This sub-block is optional. Polarity determination logic 62 merely determines whether the initial state of output waveform 22 is high or low. By convention, the duty cycle of a waveform is the percentage of time that the waveform is high during the total waveform period. Polarity determination logic 62, in effect, allows the user to define the duty cycle of output waveform 22 as either the percentage of high time or the percentage of low time, depending upon whether the initial state of output waveform 22 is chosen to be high or low. This is useful because different peripheral devices which receive and use output waveform 22 require different polarities. Some peripheral devices require the initial state of output waveform 22 to be high, and some devices require the initial state to be low.

The third sub-block is reset and end of period determination logic 64. The reset portion of this circuitry is optional. The reset 30 input to this sub-block merely forces the value of the output waveform 22 to a particular reset state. In alternate embodiments, the reset 30 signal could be a control signal for disabling output waveform 22 or for performing some other function which required the output to be forced to a known state. In the present embodiment, whether the reset state of output waveform 22 is high or low is defined by the polarity determination logic 62.

The remaining circuitry in the reset and end of period determination logic 64 causes output waveform 22 to be inverted when the end of the period of output waveform 22 has been reached. Counter 34 asserts the end of period signal 52 when counter 34 reaches its maximum count value and rolls over to its lowest count value. The end of period signal 52 is received by the reset and end of period determination logic 64 and is used to indicate that the end of the period of output waveform 22 has been reached and that the logic state of output waveform 22 should once again be inverted.

In summation, the above specification describes a data processing system 10 having a high resolution counter module 16 which has improved pulse width resolution. By incrementing counter 34 by a predetermined power of two and delaying the inversion of the output waveform 22 for duty control 24 values that are not exactly a power of two, the pulse width resolution period (PWRP) can be improved by the predetermined power of two. For example, incrementing counter 34 by two and delaying the inversion of the output waveform 22 for "odd" duty control 24 values, the pulse width resolution period (PWRP) can be reduced by one-half which is a doubling of performance.

While the present invention has been illustrated and described with reference to specific embodiments, further modifications and improvements will occur to those skilled in the art. For example, the data processing system 10 may or may not be contained on a single semiconductor chip. As an example of this, data processor 12 may be contained on a semiconductor chip and clock generator 14 may be an oscillator that is not contained on that same semiconductor chip. The high resolution counter module 16 may be part of a timer or serial subsystem 18 within data processing system 10. Various frequencies of input clock 20 could be used, with the maximum frequency determined by the limitations of the circuitry. The number of stages in counter 34 may be any number. Also, counter 34 may be a down counter that decrements rather than increments, and thus counter 34 counts down until it rolls over from its minimum count value to its maximum count value.

As an additional modification, the edge adjustment of output waveform 22 could be made for all "even" duty control 24 values rather than for all "odd" duty control 24 values. Instead of output waveform 22 being lengthened for all "odd" values, output waveform 22 could be shortened by one-half input clock 20 period for all "even" values. In order to be able to shorten output waveform 22, there must be a delay in the actual inversion of output waveform 22 in order to allow for any shortening of output waveform 22 that is required.

It is to be understood, therefore, that this invention is not limited to the particular forms illustrated and that it is intended in the appended claims to cover all modifications that do not depart from the spirit and scope of this invention.

We claim

1. A data processing system, comprising:
   a high resolution counter, said high resolution counter receiving a clock signal having a predetermined period and a predetermined half-period, the predetermined half-period being equal to one-half the predetermined period;
   wherein said high resolution counter comprises:
      counter means for counting, said counter means having a count value, the count value having a first portion and a second portion;
      compare means for comparing, said compare means being coupled to said counter means, said compare means for receiving a duty control value, the duty control value having a first portion and a second portion, said compare means for comparing the first portion of the duty control value to the first portion of the count value; and
      waveform means for generating an output signal, said waveform means being coupled to said compare means, if the duty control value is an even value, then the output signal transitions from a first logic state to a second logic state when the first portion of the duty control value matches the first portion of the count value, but if the duty control value is an odd value, then the output signal transitions from the first logic state to the second logic state one predetermined half-period after the first portion of the duty control value matches the first portion of the count value.

2. A data processing system according to claim 1, wherein the output signal transitions from the second logic state to the first logic state when the count value is a predetermined roll over value.

3. A data processing system according to claim 1, wherein said high resolution counter further comprises:
   resolution selection circuitry for selecting one of a higher resolution mode and a lower resolution mode, said counter means being incremented/decremented by ones when the lower resolution mode is selected, and said counter means being incremented/decremented by twos when the higher resolution mode is selected.

4. A data processing system according to claim 1, wherein said high resolution counter further comprises:
   a polarity control signal, the first logic state being a higher voltage state when said polarity control signal has a first polarity value, and the first logic state being a lower voltage state when said polarity control signal has a second polarity value.

5. The data processing system according to claim 1, wherein the high resolution counter performs one of a timer function and a serial communication function.

6. The data processing system according to claim 1 wherein the data processing system is contained on a semiconductor chip.

7. The data processing system according to claim 1, further comprising:
   a reset signal for forcing the output signal to an output signal reset state.

8. The data processing system according to claim 1, further comprising:
   a data processor, coupled to said high resolution counter, said data processor providing the duty control value to said high resolution counter; and
   a clock generator, coupled to said high resolution counter, said clock generator providing the clock signal to said high resolution counter.

9. The data processing system according to claim 8, wherein the data processor performs pulse width modulation of the output signal.

10. A method of using a clock signal to generate a signal waveform having improved pulse width resolution, the clock signal having a predetermined period and a predetermined half-period, the predetermined half-period being equal to one-half the predetermined period, the method comprising the steps of:
    receiving the clock signal;
    receiving a duty control value;
    incrementing/decrementing a count value by $2^N$, where N is an integer greater than or equal to zero;
    comparing at least a portion of the duty control value to at least a portion of the count value;
    asserting a match signal when the at least a portion of the duty control value matches the at least a portion of the count value;
    if the duty control value is an integer multiple of $2^N$, transitioning the signal waveform from a first logic state to a second logic state when the match signal is asserted; and
    if the duty control value is not an integer multiple of $2^N$ and if the duty control value equals $2^N+1$, transitioning the signal waveform from a first logic state to a second logic state one predetermined half-period after the match signal is asserted.

11. A method according to claim 10, further comprising the step of:
    transitioning the signal waveform from the second logic state to the first logic state when the count value is a predetermined roll over value.

12. A method according to claim 10, further comprising the step of:
    providing a polarity control signal, the first logic state being a higher voltage state when the polarity control signal has a first polarity value, and the first logic state being a lower voltage state when the polarity control signal has a second polarity value.

13. A method according to claim 10, further comprising the steps of:
    providing a reset signal; and
    forcing the signal waveform to a reset state when the reset signal is asserted.

14. A method according to claim 10, further comprising the step of:
    using the signal waveform to perform one of a timer function and a serial communication function.

15. A method according to claim 10, further comprising the steps of:
    calculating the duty control value in a data processor; and
    using the data processor to perform pulse width modulation of the signal waveform.

16. A method according to claim 10, further comprising the step of:
    providing a resolution control signal for selecting the integer N.

17. In a data processing system having a clock signal, the clock signal having a predetermined period and a predetermined half-period, the predetermined half-period being equal to one-half the predetermined period, a method of generating a signal waveform using the clock signal, the method comprising the steps of:

storing a count value, the count value having a least significant bit and a plurality of most significant bits;

receiving the clock signal;

receiving a duty control value, the duty control value having a least significant bit and a plurality of most significant bits;

selecting one of a lower resolution mode and a higher resolution mode;

if the lower resolution mode has been selected, performing the following steps:

(a) incrementing/decrementing the count value by ones using the clock signal;

(b) comparing the duty control value and the count value; and (c) transitioning the signal waveform from a first logic state to a second logic state when the duty control value matches the count value; and if the higher resolution mode has been selected, performing the following steps:

(i) incrementing/decrementing the counter by twos using the clock signal;

(ii) comparing the plurality of most significant bits of the duty control value to the plurality of most significant bits of the count value;

(iii) if the duty control value is an even value, transitioning the signal waveform from the first logic state to the second logic state when the plurality of most significant bits of the duty control value matches the plurality of most significant bits of the count value; and (iv) if the duty control value is an odd value, transitioning the signal waveform from a first logic state to a second logic state one predetermined half-period after the plurality of most significant bits of the duty control value matches the plurality of most significant bits of the count value.

18. A method according to claim 17, further comprising the step of:

transitioning the signal waveform from the second logic state to the first logic state when the count value is a predetermined roll over value.

19. A method according to claim 17, further comprising the step of:

providing a polarity control signal, the first logic state being a higher voltage state when the polarity control signal has a first polarity value, and the first logic state being a lower voltage state when the polarity control signal has a second polarity value.

20. A method according to claim 17, further comprising the steps of:

providing a reset signal; and forcing the signal waveform to a reset state when the reset signal is asserted.

* * * * *